(12) United States Patent
Hakola et al.

(10) Patent No.: US 12,004,106 B2
(45) Date of Patent: Jun. 4, 2024

(54) SIDELINK SYNCHRONIZATION UPDATE

(71) Applicant: Nokia Solutions and Networks Oy, Espoo (FI)

(72) Inventors: Sami-Jukka Hakola, Kempele (FI); Jorma Johannes Kaikkonen, Oulu (FI); Jari Olavi Lindholm, Palojoki (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 119 days.

(21) Appl. No.: 17/420,179

(22) PCT Filed: Jan. 10, 2020

(86) PCT No.: PCT/EP2020/050483
§ 371 (c)(1),
(2) Date: Jul. 1, 2021

(87) PCT Pub. No.: WO2020/144304
PCT Pub. Date: Jul. 16, 2020

(65) Prior Publication Data
US 2022/0159599 A1  May 19, 2022

Related U.S. Application Data

(60) Provisional application No. 62/791,097, filed on Jan. 11, 2019.

(51) Int. Cl.
*H04W 56/00* (2009.01)
*H04L 27/26* (2006.01)
*H04W 92/18* (2009.01)

(52) U.S. Cl.
CPC ..... *H04W 56/0015* (2013.01); *H04L 27/2657* (2013.01); *H04W 56/0025* (2013.01); *H04W 92/18* (2013.01)

(58) Field of Classification Search
CPC ......... H04W 56/0015; H04W 56/0025; H04W 92/18; H04L 27/2657
See application file for complete search history.

(56) References Cited

U.S. PATENT DOCUMENTS

| | | | |
|---|---|---|---|
| 2015/0181546 A1* | 6/2015 | Freda | H04W 76/14 370/336 |
| 2015/0264588 A1* | 9/2015 | Li | H04W 56/002 370/350 |

(Continued)

FOREIGN PATENT DOCUMENTS

| | | | | |
|---|---|---|---|---|
| EP | 3310101 A1 * | 4/2018 | | H04W 56/00 |

OTHER PUBLICATIONS

3GPP TSG RAN WG1 Meeting #95, Spokane, USA, Nov. 12-16, 2018, R1-1813861, "Discussion on sidelink synchronization for NR V2X", LG Electronics, 9 pgs.

(Continued)

*Primary Examiner* — Chae S Lee
(74) *Attorney, Agent, or Firm* — Lippes Mathias LLP

(57) ABSTRACT

The example and non-limiting embodiments relate generally to synchronization and, more particularly, to a sidelink synchronization procedure. Exemplified embodiments are provided that may include determining a new synchronization source by a source user equipment, where the source user equipment is configured to provide synchronization to at least one receiving user equipment with use of a sidelink. The exemplified embodiments may further include transmitting by the source user equipment to the at least one receiving user equipment an indication that the source user equipment will update from a current synchronization source to the new synchronization source. The exemplified embodiments may further include transmitting synchronization signals and control signals from the source user equipment to the at least one receiving user equipment using an (Continued)

updated reference frequency corresponding to use of the new synchronization source by the source user equipment.

12 Claims, 5 Drawing Sheets

(56) References Cited

U.S. PATENT DOCUMENTS

| | | | | |
|---|---|---|---|---|
| 2016/0286506 A1* | 9/2016 | Chae | ............... | H04L 5/0051 |
| 2018/0139710 A1* | 5/2018 | Li | ............... | H04W 56/00 |
| 2018/0295009 A1* | 10/2018 | Lindoff | ............... | H04W 56/001 |
| 2020/0120626 A1* | 4/2020 | Sartori | ............... | H04W 56/001 |

OTHER PUBLICATIONS

3GPP TR 38.885 V1.0.0, "$3^{rd}$ Generation partnership Project; Technical Specification Group Radio Access Network; NR; Study on Vehicle-to-Everything (Release 16)", Nov. 2018, 23 pages.

R1-1812843, "Discussion on sidelink synchronization for NR-V2X", LG Electronics, 3GPP TSG RAN WG1 Meeting #95, Nov. 2018, 5 pages.

* cited by examiner

SIDELINK SYNCHRONIZATION UPDATE

This patent application is a U.S. National Stage application of International Patent Application Number PCT/EP2020/050483 filed Jan. 10, 2020, which is hereby incorporated by reference in its entirety, and claims priority to U.S. provisional application 62/791,097 filed Jan. 11, 2019, which is hereby incorporated by reference in its entirety.

BACKGROUND

Technical Field

The example and non-limiting embodiments relate generally to synchronization and, more particularly, to a sidelink synchronization procedure.

Brief Description of Prior Developments

4G Long Term Evolution (LTE) includes a possible sidelink communication.

SUMMARY

In accordance with some embodiments, a method may include determining a new synchronization source by a source user equipment. The method may further include that the source user equipment is configured to provide synchronization to at least one receiving user equipment with use of a sidelink. The method may further include transmitting by the source user equipment to the at least one receiving user equipment an indication that the source user equipment will update from a current synchronization source to the new synchronization source. The method may further include transmitting synchronization signals and control signals from the source user equipment to the at least one receiving user equipment using an updated reference frequency corresponding to use of the new synchronization source by the source user equipment.

In accordance with some embodiments, a method may further include determining by the source user equipment a frequency offset between the current synchronization source and the new synchronization source, and transmitting the frequency offset from the source user equipment to the at least one receiving user equipment.

In accordance with some embodiments, a method may further include that the frequency offset is transmitted with the indication.

In accordance with some embodiments, a method may further include transmitting by the source user equipment to the at least one receiving user equipment timing information regarding when the source user equipment will start using the new synchronization source.

In accordance with some embodiments, a method may further include that the timing information is transmitted with the indication.

In accordance with some embodiments, an apparatus may include at least one processor and at least one non-transitory memory including computer program code. The at least one memory and the computer program code may be configured to, with the at least one processor, cause the apparatus to at least determine a new synchronization source by the apparatus. The apparatus may comprise a source user equipment. The source user equipment may be configured to provide synchronization to at least one receiving user equipment with use of a sidelink. The at least one memory and the computer program code may be further configured to, with the at least one processor, cause the apparatus to at least cause transmitting by the apparatus to the at least one receiving user equipment an indication that the source user equipment will update from a current synchronization source to the new synchronization source. The at least one memory and the computer program code may be further configured to, with the at least one processor, cause the apparatus to at least cause transmitting of synchronization signals and control signals from the apparatus to the at least one receiving user equipment using an updated reference frequency corresponding to use of the new synchronization source by the source user equipment.

In accordance with some embodiments, an apparatus may include at least one processor and at least one non-transitory memory including computer program code. The at least one memory and the computer program code may be further configured to, with the at least one processor, cause the apparatus to at least determine a frequency offset between the current synchronization source and the new synchronization source. The at least one memory and the computer program code may be further configured to, with the at least one processor, cause the apparatus to at least cause transmitting of the frequency offset from the apparatus to the at least one receiving user equipment.

In accordance with some embodiments, an apparatus may include at least one processor and at least one non-transitory memory including computer program code. The at least one memory and the computer program code may be further configured to, with the at least one processor, cause the apparatus to at least cause transmitting of the frequency offset with the indication.

In accordance with some embodiments, an apparatus may include at least one processor and at least one non-transitory memory including computer program code. The at least one memory and the computer program code may be further configured to, with the at least one processor, cause the apparatus to at least cause transmitting, by the apparatus to the at least one receiving user equipment, timing information regarding when the source user equipment will start using the new synchronization source.

In accordance with some embodiments, an apparatus may include at least one processor and at least one non-transitory memory including computer program code. The at least one memory and the computer program code may be further configured to, with the at least one processor, cause the apparatus to at least cause transmitting of the timing information with the indication.

In accordance with some embodiments, a non-transitory program storage device readable by a machine, tangibly embodying a program of instructions executable by the machine for performing operations, the operations may include determining a new synchronization source by a source user equipment. The operations may further include that the source user equipment is configured to provide synchronization to at least one receiving user equipment with use of a sidelink. The operations may further include transmitting by the source user equipment to the at least one receiving user equipment an indication. The indication may further include that the source user equipment will update from a current synchronization source to the new synchronization source. The operations may further include transmitting synchronization signals and control signals from the source user equipment to the at least one receiving user equipment using an updated reference frequency corresponding to use of the new synchronization source by the source user equipment.

In accordance with some embodiments, a non-transitory program storage device readable by a machine, tangibly embodying a program of instructions executable by the machine for performing operations, the operations may further include determining by the source user equipment a frequency offset between the current synchronization source and the new synchronization source. The operations may further include transmitting the frequency offset from the source user equipment to the at least one receiving user equipment.

In accordance with some embodiments, a non-transitory program storage device readable by a machine, tangibly embodying a program of instructions executable by the machine for performing operations, the operations may further include that the frequency offset is transmitted with the indication.

In accordance with some embodiments, a non-transitory program storage device readable by a machine, tangibly embodying a program of instructions executable by the machine for performing operations, the operations may further include transmitting by the source user equipment to the at least one receiving user equipment timing information regarding when the source user equipment will start using the new synchronization source.

In accordance with some embodiments, a non-transitory program storage device readable by a machine, tangibly embodying a program of instructions executable by the machine for performing operations, the operations may further include that the timing information is transmitted with the indication.

In accordance with some embodiments, an apparatus may include at least means for determining a new synchronization source by a source user equipment, where the source user equipment is configured to provide synchronization to at least one receiving user equipment with use of a sidelink. The apparatus may further include at least means for transmitting by the source user equipment to the at least one receiving user equipment an indication that the source user equipment will update from a current synchronization source to the new synchronization source. The apparatus may further include at least means for transmitting synchronization signals and control signals from the source user equipment to the at least one receiving user equipment using an updated reference frequency corresponding to use of the new synchronization source by the source user equipment.

In accordance with some embodiments, a method may include receiving, by a receiving user equipment from a source user equipment with use of a sidelink between the source user equipment and the receiving user equipment, an indication that the source user equipment will update from a current synchronization source to a new synchronization source. The method may further include determining, based upon the indication, by the receiving user equipment a frequency offset to be applied by the receiving user equipment to new synchronization signals received from the source user equipment. The method may further include maintaining synchronization of the receiving user equipment with the source user equipment, with use of the frequency offset, after the source user equipment updates to the new synchronization source.

In accordance with some embodiments, an apparatus may include at least one processor and at least one non-transitory memory including computer program code. The at least one memory and the computer program code may be configured to, with the at least one processor, cause the apparatus to at least receive, by the apparatus from a source user equipment with use of a sidelink between the source user equipment and the apparatus, an indication that the source user equipment will update from a current synchronization source to a new synchronization source, where the apparatus comprises a receiving user equipment. The at least one memory and the computer program code may be further configured to, with the at least one processor, cause the apparatus to at least determine, based upon the indication, by the receiving user equipment a frequency offset to be applied by the receiving user equipment to new synchronization signals received from the source user equipment. The at least one memory and the computer program code may be further configured to, with the at least one processor, cause the apparatus to at least maintain synchronization of the receiving user equipment with the source user equipment, with use of the frequency offset, after the source user equipment updates to the new synchronization source.

In accordance with some embodiments, a non-transitory program storage device readable by a machine, tangibly embodying a program of instructions executable by the machine for performing operations, the operations may include causing receiving, by a receiving user equipment from a source user equipment with use of a sidelink between the source user equipment and the receiving user equipment, of an indication that the source user equipment will update from a current synchronization source to a new synchronization source. The operations may further include determining, based upon the indication, by the receiving user equipment a frequency offset to be applied by the receiving user equipment to new synchronization signals received from the source user equipment. The operations may further include causing maintaining of synchronization of the receiving user equipment with the source user equipment, with use of the frequency offset, after the source user equipment updates to the new synchronization source.

In accordance with some embodiments, an apparatus may include at least means for receiving, by a receiving user equipment from a source user equipment with use of a sidelink between the source user equipment and the receiving user equipment, an indication that the source user equipment will update from a current synchronization source to a new synchronization source. The apparatus may further include at least means for determining, based upon the indication, by the receiving user equipment a frequency offset to be applied by the receiving user equipment to new synchronization signals received from the source user equipment. The apparatus may further include at least means for maintaining synchronization of the receiving user equipment with the source user equipment, with use of the frequency offset, after the source user equipment updates to the new synchronization source.

BRIEF DESCRIPTION OF THE DRAWING

For proper understanding of this disclosure, reference should be made to the accompanying drawings, wherein.

DETAILED DESCRIPTION OF EMBODIMENTS

Figure 1:
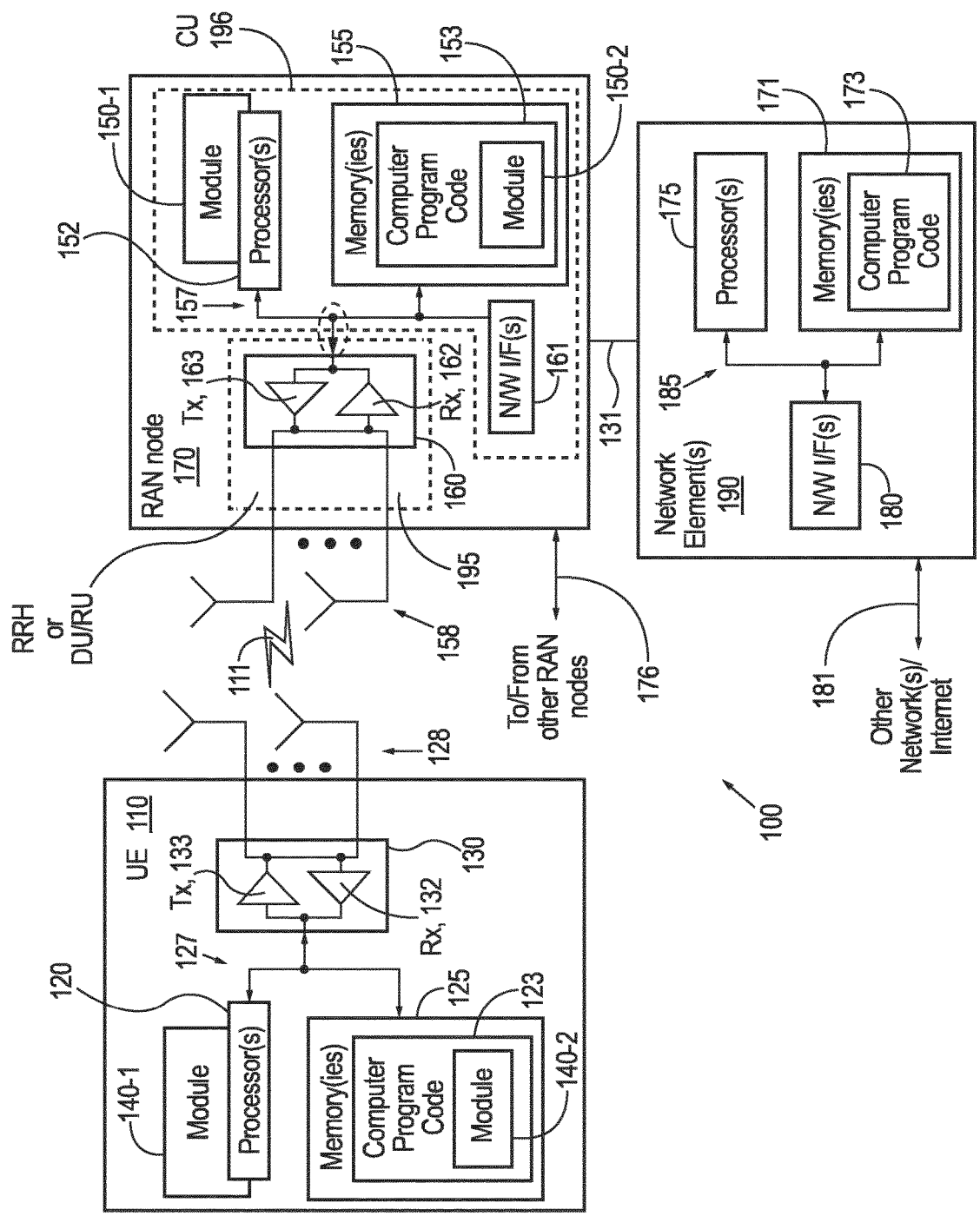
FIG. 1, shows a block diagram of one possible and non-limiting example system in which the example embodiments may be practiced.

The following abbreviations that may be found in the specification and/or the drawing figures are defined as follows:
3GPP third generation partnership project
5G fifth generation
5GC 5G core network
AMF access and mobility management function
CU central unit
DU distributed unit
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
gNB (or gNodeB) 5G Node B; base station for 5G/NR, i.e., a node providing NR user plane and control plane protocol terminations towards the UE, and connected via the NG interface to the 5GC
GNSS Global Navigation Satellite System
I/F interface
LTE long term evolution
MAC medium access control
MME mobility management entity
ng or NG new generation
ng-eNB or NG-eNB new generation eNB
NR new radio
N/W or NW network
PDCP packet data convergence protocol
PHY physical layer
PSS Primary Synchronization Signals
RAN radio access network
Rel release
RLC radio link control
RRH remote radio head
RRC radio resource control
RU radio unit
Rx receiver
SDAP service data adaptation protocol
SGW serving gateway
SL sidelink
SMF session management function
SSS Secondary Synchronization Signals
TS technical specification
Tx transmitter
UE user equipment (e.g., a wireless, typically mobile device)
UPF user plane function Turning to FIG. 1, this figure shows a block diagram of one possible and non-limiting example system in which the example embodiments may be practiced. A user equipment (UE) 110, radio access network (RAN) node 170, and network element(s) 190 are illustrated. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 is a base station that provides access by wireless devices such as the UE 110 to the wireless network 100. The RAN node 170 may be, for instance, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (e.g., the network element (s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of an RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 communicate using, e.g., link 176. The link 176 may be wired or wireless or both and may implement, e.g., an Xn interface for 5G, an X1 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, e.g., fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that the base station that forms the cell will perform the functions. The cell makes up part of a base station. That is, there can be multiple cells per base station. For instance, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely example functions that may be supported by the network element(s) 190, and note that both 5G and LTE functions might be supported. The RAN node 170 is coupled via a link 131 to a network element 190. The link 131 may be implemented as, e.g., an NG interface for 5G, or an Si interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, vehicles, as well as portable units or terminals that incorporate combinations of such functions.

Having thus introduced one suitable but non-limiting technical context for the practice of the example embodiments of this invention, the example embodiments will now be described with greater specificity.

As part of the expansion of the LTE platform to new services, and to keep track with the increasing needs of the automotive industry, 3GPP is developing functionality to provide enhancements for device-to-device (D2D) communications and specifically for vehicular communications; both in terms of direct communication (between vehicles, vehicle to pedestrian and vehicle to infrastructure) and for cellular communications with networks. This includes implementation into 5G also known as New Radio (NR) and includes a Vehicle-to-Everything (V2X) standard. As part of Vehicle-to-Everything (V2X), there is also Vehicle-to-Vehicle (V2V) communications, with further enhancements to support additional V2X operational scenarios.

V2V communications are based on D2D communications defined as part of ProSe services in Release 12 and Release 13 of the specification. As part of ProSe services, a new D2D interface (designated as PC5, also known as sidelink at the physical layer) was introduced and now as part of the V2V Work Item (WI). It has been enhanced for vehicular use cases; specifically addressing high speed (such as up to 250 Kph for example) and high density (such as thousands of nodes for example).

Figures 2A, 2B, 2C:
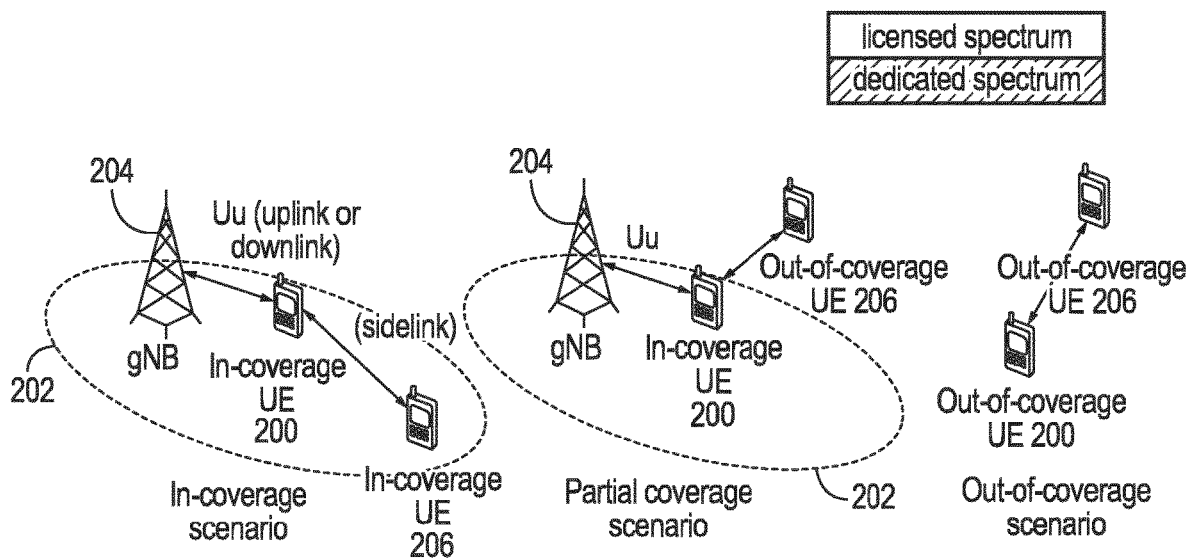
FIG. 2A, shows an example of the in-coverage scenario in which the example embodiments may be practiced.
FIG. 2B, shows an example of the partial coverage scenario in which the example embodiments may be practiced.
FIG. 2C, shows an example of the out-of-coverage scenario in which the example embodiments may be practiced.
Figure 3:
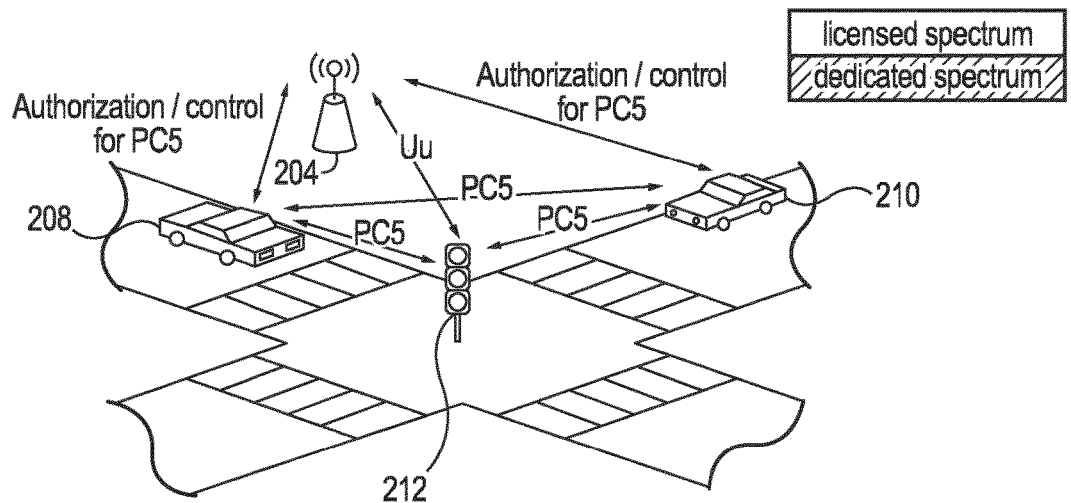
FIG. 3 shows another example in which the example embodiments may be practiced.
Figure 4:
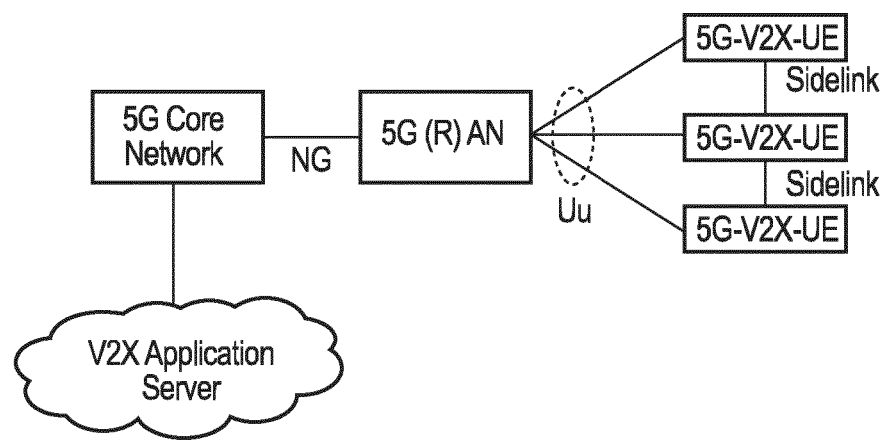
FIG. 4 shows a schematic diagram illustrating an example of sidelink utilization in which the example embodiments may be practiced.

Features as described herein may be used in relation to 3GPP New Radio (NR) physical layer design. More specifically, features may be used in regard to a sidelink (SL) synchronization procedure. New Radio (NR) sidelink (SL) supports broadcast, groupcast and unicast transmissions for the in-coverage, partial-coverage and out-of-coverage scenarios, as described in 3GPP TR 38.885 for example. Discovery and synchronization procedures are fundamental functionalities to enable different transmission schemes among the UEs. Referring also to FIGS. 2A-2C, some examples of the in-coverage scenario, the partial-coverage scenario and out-of-coverage scenario are shown. In the example of the in-coverage scenario shown in FIG. 2A, the first UE 200 is within the cell 202 of the gNB 204 and the second UE 206 is also within the cell 202 of the gNB 204. In the example of the partial coverage scenario shown in FIG. 2B, the first UE 200 is within the cell 202 of the gNB 204 and the second UE 206 is outside the cell 202 of the gNB 204. In the example of the out-of-coverage scenario shown in FIG. 2C, both the first UE 200 and the second UE 206 are not in the cell 202 of the gNB 204. FIG. 3 shows another example where the vehicles 208, 210 are also in communications with each other via a sidelink (SL) (PC5 in this example), and/or the vehicles 208, 210 may be in communication with a base station 204 and/or the vehicles 208, 210 may be in communication with the communication node at the traffic light 212 via the sidelinks (SL) (PC5s in this example). FIG. 4 also provides a schematic diagram illustrating an example of sidelinks among three UEs, possible connection(s) to the 5G RAN as well as connections to the 5G Core Network and a V2X Application server.

The SL synchronization may include the following:
  SL synchronization signals:
    SL primary synchronization signal (S-PSS),
    SL secondary synchronization signal (S-SSS);
  Physical SL broadcast channel (PSBCH);
  SL synchronization sources and procedures S-PSS, S-SSS and PSBCH may be structured in a block format (S-SSB) which supports periodic transmission. The S-SSB may have the same numerology (i.e. SCS and CP length) as PSCCH/PSSCH in a carrier, and its transmission bandwidth may be within the (pre-)configured SL Bandwidth Part (BWP) as described in 3GPP TR 38.885 for example.

The SL UE may have different synchronization sources, such as one at a time, including: GNSS, gNB, eNB, NR UE as described in 3GPP TR 38.885 for example.

Referring particularly to FIG. 2C, in one example embodiment, a synchronization source UE 200 in out-of-coverage, prior to switching its own synchronization source and correspondingly transmission frequency according to a new synchronization source, may indicate to the UE 206 in the out-of-coverage situation that the source UE 200 will change the transmission frequency, but still continue as a synchronization source to provide (updated) reference frequency.

In one example embodiment, the indication may include information indicating a frequency offset amount in frequency units with a certain granularity. The granularity may be subcarrier spacing specific for example. For example, the granularity may be:
  1.5 kHz with 15 kHz Subcarrier Spacing (SCS) applied for the synchronization signals and/or control signaling provided by the UE;
  3 kHz with 30 kHz Subcarrier Spacing (SCS) applied for the synchronization signals and/or control signaling provided by the UE
  These are merely examples and should not be considered as limiting.

In another example embodiment, the indication include may include information indicating a frequency location of the updated synchronization source. For example the indication of a frequency location may be:
  RF channel such as, for example, Absolute Radio Frequency Channel Number (ARFCN);
  synchronization raster location such as, for example, Global Synchronization Channel Number (GSCN),
but ARFCN could be useful, and the new source detected would have rule(s)/configuration(s) determining where the synchronization signal can be sent (co-existence).

In one example embodiment, the indication may also comprise information indicating the applied numerology used for the coming synchronization signal transmissions. This information may be provided because the new source for the source UE may be a gNB which is operating using a different Subcarrier Spacing (SCS) than the source UE was previously having when operating as the synch source for a receiving UE.

In one example embodiment, the above mentioned synchronization source UE may schedule explicitly resources for the synchronization signal transmission using the updated reference frequency. For example:
  The scheduling and indication takes place using the original reference frequency;
  Alternatively the indication above may indicate that the next opportunity of synchronization signal(s) will be using the new (updated) reference frequency;
  In addition to indication of the frequency offset and potential new time-frequency resources of the synchronization signal, the source UE may indicate the new PSS/SS sequences/polynomials and information related to the UE's own synchronization source (such as, for example, if the UE is using gNB or GNSS to generate synchronization signals).

In one example embodiment there is synchronized time provided by the synchronization source or determined. For example, this may be determined from the explicitly scheduled resources for the synchronization signal or the above mentioned indication may indicate when the updated reference frequency is in use for regular (periodic) synchronization signal transmission by the source.

In one example embodiment, the indication may also indicate that the UE will stop being a synchronization source. The indication may also provide information about the new synchronization source and corresponding resources on which the new synchronization source transmits the synchronization signals and/or common information.

The receiving UE 206 (i.e. UE that follows the above mentioned synchronization source UE 200) may determine based on the indication that the current synchronization source is changing its own source, and the receiving UE 206 may update the reference frequency. The receiving UE 206 may determine from the indication how much and to which direction in frequency the reference frequency will be updated. The receiving UE may determine the resources for the synchronization signal transmission(s) from the source UE with updated reference frequency. The receiving UE may determine the new PSS/SS sequences/polynomials and information related to the source UE's synchronization source.

A large reference frequency change can take place when a source UE, such as 200 for example, moves from out-of-coverage, such as shown in FIG. 2C for example, to a cell or GNSS coverage area, such as shown in FIG. 2B for example, and starts to use a new synchronization reference for its own synchronization signal transmission to the receiving UE, such as 206 for example. In this case the indication from 200 to 206 of the synchronization source change is clearly beneficial. The indication can also be useful when the source UE moves out of a coverage area of a cellular network or GNSS and starts to use its own oscillator or other UEs synchronization signals, such as from the situation shown in FIG. 2B to the situation shown in FIG. 2C for example. This is because the UE may need to change PSS/SSS sequences and/or other details of the synchronization signals when its own synchronization reference changes.

Figure 5:
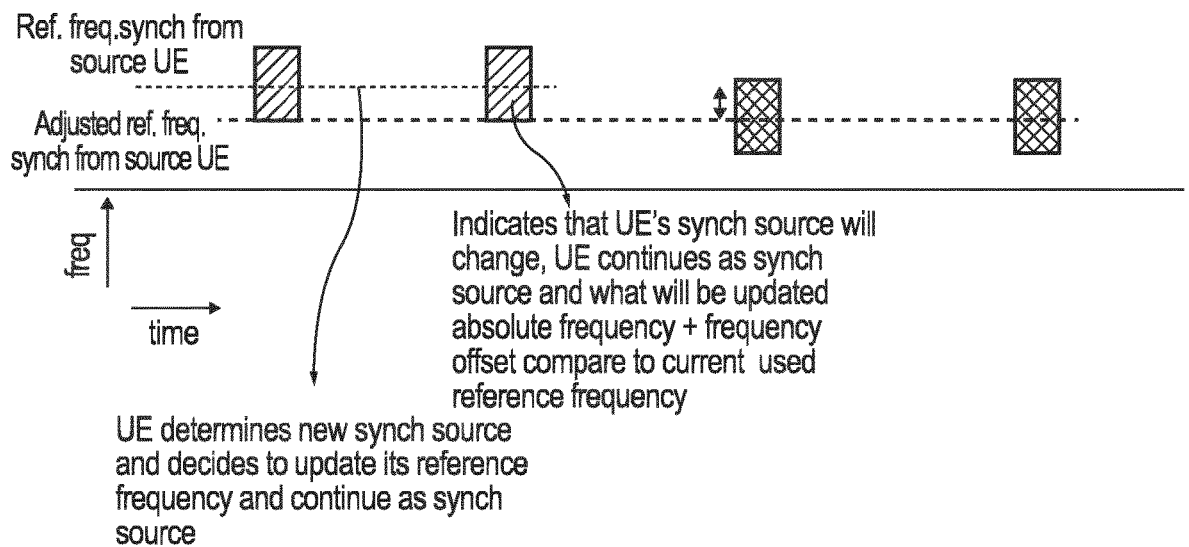
FIG. 5 shows an example illustration of a source UE scenario according to the example embodiments of the invention.

Referring also to FIG. 5, the steps noted may be considered for the synchronization source UE. The source UE may provide synchronization based on its current synchronization source such as its own oscillator, GNSS, another UE, eNB or gNB. The source UE may determine that it needs to change its own synchronization source. This may be, for example, where the need for change is due to:

the synchronization source UE moves from an out-of-coverage situation to an in-coverage situation, where the new source is for example:
  gNB
the synchronization source UE moves from an in-coverage situation to an out-of-coverage situation, where the new source is for example:
  the UE's own oscillator,
  GNSS,
  another UE
the synchronization source UE moves out of coverage of a GNSS, where the new source is for example:
  gNB,
  the UE's own oscillator,
  another UE The synchronization source UE may determine frequency offset (frequency correction) based on comparing a difference between a current absolute frequency and a new absolute frequency (such as received by the synchronization source UE from the new synchronization source) versus a difference between the current frequency and the frequency on which synchronization source UE finds the new synch source.

The synchronization source UE may transmit to the other sidelinked UE(s), such as before a change occurs for example, the indication that the source UE will change the transmission frequency, but still continue as the synchronization source UE to provide (updated) reference frequency for a receiving UE after the change occurs. This may be together with information such as, for example:

a. what the frequency offset for the new transmission frequency is compared to the currently used transmission frequency, b. what the transmission resources will be for providing the synchronization on the new reference frequency. Frequency domain information may be the absolute frequency point or some relative indication compared to the frequency resources used by the source before the update, c. timing information in regard to when the new transmission frequency and corresponding resources are in use and when the source UE does not transmit any more using the old transmission frequency and corresponding resources, d. the new PSS/SS sequences/polynomials and information related to source UE's own synchronization source (e.g. if the source UE is using gNB or GNSS to generate synchronization signals).

The synchronization source UE may then transmit the synchronization signals and the associated control information using the indicated new transmission frequency and corresponding resources.

Figure 6:
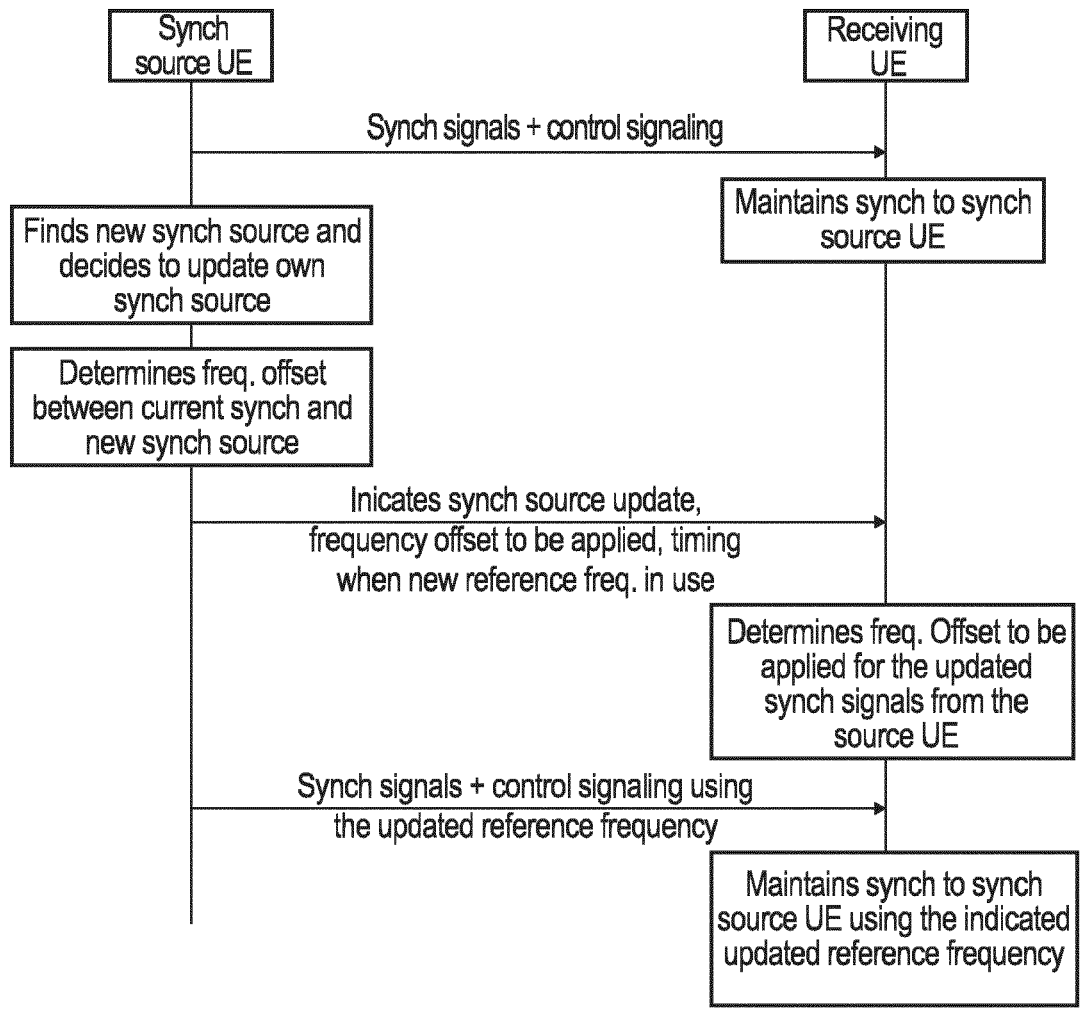
FIG. 6 shows a signaling diagram according to the example embodiments of the invention.

Referring also to FIG. 6, the following steps may be considered for the receiving UE:

the receiving UE receives the synchronization signals and/or control signaling from the synch source UE, the receiving UE may determine from the control signaling that the source UE will update the reference frequency and/or radio resources for the coming synchronization signals and control signaling, and the receiving UE may also determine when the update will happen, the receiving UE may acquire synchronization and control information using the indicated new reference frequency (frequency offset and/or new absolute frequency), and re-synchronization may takes place without extensive search because of the received indication noted above.

With features as described herein, a synchronization procedure may provided as a means for a smooth transition of a synchronization source between different coverage situations without causing a long interrupt time for the on-going communication between the source UE and sidelinked receiving UE(s) following the source UE. With features as described herein, higher user experience, reliability and quality of service can be provided.

In a conventional system, such as in LTE sidelink for example, it has not been defined what happens when a synchronization source transmission changes, for example when an out-of-coverage UE moves to in-coverage. When such as change occurred, the sidelinked receiving UEs that were following that source UE in out-of-coverage determine that synch has been lost, and the they start a procedure to find a new synch source. This causes the above mentioned problems for the on-going communication. R1-1812843 has proposed that the non-source receiving UE could have a multi-cluster synchronization and would be able to follow multiple source UEs, but these proposed methods do not solve the problem noted above in regard to a smooth transition of a synchronization source from out-of-coverage to in-coverage. The proposal in R1-1812843 would also increase a UE's complexity because of requiring tracking multiple (asynchronous) source UEs.

Initial frequency error for SL synchronization can be at least ±5 ppm as defined in 3GPP TR 38.885 in simulation assumptions related to synchronization studies. Thus, a UE that acts as a synchronization source in an out-of-coverage situation may have frequency error uniformly distributed within [−5, 5] ppm of a nominal carrier frequency in relation to an absolute (correct) frequency that the gNB is (almost) having.

Table 1 and Table 2 below present frequency error for different subcarrier spacing options at 6 and 30 GHz carrier frequencies, respectively. For feasible Quadrature Phase Shift Keying (QPSK) signal detection performance, the frequency error is desired to be less than 0.1 of the applied SCS, and much less for higher order modulations.

TABLE 1

Frequency error at 6 GHz nominal carrier frequency

| SCS [kHz] | Freq. error [kHz] | Relative freq. error subject to SCS | Error more than 0.1x of SCS |
|---|---|---|---|
| 15 | ±30 | Up to 2x | Yes |
| 30 | ±30 | Up to 1x | Yes |
| 60 | ±30 | Up to 0.5x | Yes |

TABLE 2

Frequency error at 30 GHz nominal carrier frequency

| SCS [kHz] | Freq. error[kHz] | Relative freq. error subject to SCS[%] | Error more than 0.1x of SCS |
|---|---|---|---|
| 60 | ±150 | Up to 2.5x | Yes |
| 120 | ±150 | Up to 1.25x | Yes |

With the conventional system, a problem would arise when an out-of-coverage UE, which acts as a synchronization source to another out-of-coverage receiving UE(s), moves to an in-coverage situation, synchronizes to a gNB (which is of higher priority source) and continues providing communication to the other out-of-coverage receiving UE(s). The frequency correction this source UE does, as shown in the above tables, means that the out-of-coverage UE(s) will, in turn, have corresponding frequency error to their synchronization source. That will lead to a situation in which communication between the synchronization source UE (that moved from out-of-coverage to in-coverage) and other out-of-coverage receiving UE(s) will be interrupted for a time long enough to require the out-of-coverage receiving UE(s) to basically carry out a re-synchronization. This re-synchronization will have similar complexity as in an initial search in addition to a time interruption in the communication. In other words, with the conventional system there are no means to provide a smooth transition of the synchronization source from out-of-coverage to in-coverage. However features may be provided, as described herein, where a smooth transition of the synchronization source from out-of-coverage to in-coverage may be accomplished. NR V2X supports unicast and groupcast operation in the SL. It is desired that a UE pair having unicast communication, or group of UEs having groupcast communication, can maintain synchronization to each other when those UEs are moving in and out of cellular network or GNSS coverage. With features as described herein, rather than the receiving UE(s) having to start a procedure to find a new synch source, the receiving UE(s) can continue to use the same source UE.

With features as described herein a single sidelink synchronization source may indicate a change in synchronization source timing and frequency offset in an SL environment. This may be done without use of a controlling element (such as network node) sending signals to the receiving UE.

With features as described herein, the source UE may inform the receiving UE for the upcoming change of synchronization source of the source UE so that the receiving UE can synchronize to the updated source without new synchronization source searching by the receiving UE. This is enabled by providing additional sync information from the source UE to other UE(s) in the same sidelink. This is new for the specific environment of SL where a source UE is a controlling element.

Features as described herein avoid the need for a receiving UE to re-synchronization with full search (time and frequency) which would be a time consuming process and could basically mean a long interrupt to ongoing (perhaps critical) communication. Features as described herein help to ensure that a sidelinked receiving UE will be able to find and synchronize to the same source UE without any assistance information other than the information provided by the source UE. With features as described herein, the other nodes in the same sidelink can be synchronized to the source node smoothly even when the source node changes it synchronization due to some reason, such as moving from out-of-coverage to in-coverage for example.

In accordance with one example method, a method is provided comprising: determining a new synchronization source by a source user equipment, where the source user equipment is connected to, or configured to provide synchronization to, at least one receiving user equipment with use of a sidelink; transmitting by the source user equipment to the at least one receiving user equipment an indication that the source user equipment will update from a current synchronization source to the new synchronization source; and transmitting synchronization signals and control signals from the source user equipment to the at least one receiving user equipment using an updated reference frequency corresponding to use of the new synchronization source by the source user equipment.

The method may further comprise determining by the source user equipment a frequency offset between the current synchronization source and the new synchronization source, and transmitting the frequency offset from the source user equipment to the at least one receiving user equipment. The frequency offset may be transmitted with the indication. The method may further comprise transmitting by the source user equipment to the at least one receiving user equipment timing information regarding when the source user equipment will start using the new synchronization source. The timing information may be transmitted with the indication.

In accordance with one example embodiment, an apparatus is provided comprising: at least one processor; and at least one non-transitory memory including computer program code, the at least one memory and the computer program code configured to, with the at least one processor, cause the apparatus to: determine a new synchronization source by the apparatus, where the apparatus comprises a source user equipment, where the source user equipment is connected to, or configured to provide synchronization to, at least one receiving user equipment with use of a sidelink; cause transmitting by the apparatus to the at least one receiving user equipment an indication that the source user equipment will update from a current synchronization source to the new synchronization source; and cause transmitting of synchronization signals and control signals from the apparatus to the at least one receiving user equipment using an updated reference frequency corresponding to use of the new synchronization source by the source user equipment.

The at least one memory and the computer program code may be configured to, with the at least one processor, cause the apparatus to determine a frequency offset between the current synchronization source and the new synchronization source; and cause transmitting of the frequency offset from the apparatus to the at least one receiving user equipment. The at least one memory and the computer program code may be configured to, with the at least one processor, cause the apparatus to cause transmitting of the frequency offset with the indication. The at least one memory and the computer program code may be configured to, with the at least one processor, cause the apparatus to cause transmitting, by the apparatus to the at least one receiving user equipment, timing information regarding when the source user equipment will start using the new synchronization source. The at least one memory and the computer program code may be configured to, with the at least one processor, cause the apparatus to cause transmitting of the timing information with the indication.

In accordance with one example embodiment, a non-transitory program storage device readable by a machine may be provided, such as 125 shown in FIG. 1 for example, tangibly embodying a program of instructions executable by the machine for performing operations, the operations comprising: determining a new synchronization source by a source user equipment, where the source user equipment is connected to, or configured to provide synchronization to, at least one receiving user equipment with use of a sidelink; transmitting by the source user equipment to the at least one receiving user equipment an indication that the source user equipment will update from a current synchronization source to the new synchronization source; and transmitting synchronization signals and control signals from the source user equipment to the at least one receiving user equipment using an updated reference frequency corresponding to use of the new synchronization source by the source user equipment.

The operations may further comprise: determining by the source user equipment a frequency offset between the current synchronization source and the new synchronization source; and transmitting the frequency offset from the source user equipment to the at least one receiving user equipment. The frequency offset may be transmitted with the indication. The operations may further comprise transmitting by the source user equipment to the at least one receiving user equipment timing information regarding when the source user equipment will start using the new synchronization source. The timing information may be transmitted with the indication.

In accordance with one example method, a method may be provided comprising: means for determining a new synchronization source by a source user equipment, where the source user equipment is connected to, or configured to provide synchronization to, at least one receiving user equipment with use of a sidelink; means for transmitting by the source user equipment to the at least one receiving user equipment an indication that the source user equipment will update from a current synchronization source to the new synchronization source; and means for transmitting synchronization signals and control signals from the source user equipment to the at least one receiving user equipment using an updated reference frequency corresponding to use of the new synchronization source by the source user equipment.

In accordance with one example method, a method may be provided comprising: receiving, by a receiving user equipment from a source user equipment with use of a sidelink between the source user equipment and the receiving user equipment, an indication that the source user equipment will update from a current synchronization source to a new synchronization source; determining, based upon the indication, by the receiving user equipment a frequency offset to be applied by the receiving user equipment to new synchronization signals received from the source user equipment; and maintaining synchronization of the receiving user equipment with the source user equipment, with use of the frequency offset, after the source user equipment updates to the new synchronization source.

In accordance with one example embodiment, an apparatus may be provided comprising: at least one processor; and at least one non-transitory memory including computer program code, the at least one memory and the computer program code configured to, with the at least one processor, cause the apparatus to: receive, by the apparatus from a source user equipment with use of a sidelink between the source user equipment and the apparatus, an indication that the source user equipment will update from a current synchronization source to a new synchronization source, where the apparatus comprises a receiving user equipment; determine, based upon the indication, by the receiving user equipment a frequency offset to be applied by the receiving user equipment to new synchronization signals received from the source user equipment; and maintain synchronization of the receiving user equipment with the source user equipment, with use of the frequency offset, after the source user equipment updates to the new synchronization source.

In accordance with one example embodiment, a non-transitory program storage device may be provided, readable by a machine, tangibly embodying a program of instructions executable by the machine for performing operations, the operations comprising: causing receiving, by a receiving user equipment from a source user equipment with use of a sidelink between the source user equipment and the receiving user equipment, of an indication that the source user equipment will update from a current synchronization source to a new synchronization source; determining, based upon the indication, by the receiving user equipment a frequency offset to be applied by the receiving user equipment to new synchronization signals received from the source user equipment; and causing maintaining of synchronization of the receiving user equipment with the source user equipment, with use of the frequency offset, after the source user equipment updates to the new synchronization source.

In accordance with one example method, a method may be provided comprising: means for receiving, by a receiving user equipment from a source user equipment with use of a sidelink between the source user equipment and the receiving user equipment, an indication that the source user equipment will update from a current synchronization source to a new synchronization source; means for determining, based upon the indication, by the receiving user equipment a frequency offset to be applied by the receiving user equipment to new synchronization signals received from the source user equipment; and means for maintaining synchronization of the receiving user equipment with the source user equipment, with use of the frequency offset, after the source user equipment updates to the new synchronization source.

As used in this application, the term "circuitry" may refer to one or more or all of the following:
  (a) hardware-only circuit implementations (such as implementations in only analog and/or digital circuitry) and
  (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and
  (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects are set out above, other aspects comprise other combinations of features from the described embodiments, and not solely the combinations described above.

It is also noted herein that while the above describes example embodiments of the invention, these descriptions should not be viewed in a limiting sense. Rather, there are several variations and modifications which may be made without departing from the scope of the present invention. It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A method comprising:
    transmitting, by a source user equipment, a first synchronization signal to at least one receiving user equipment with use of a sidelink, the first synchronization signal having a first frequency;
    transmitting, by the source user equipment to the at least one receiving user equipment, an indication of a second frequency; and
    transmitting, by the source user equipment to the at least one receiving user equipment, a second synchronization signal having the second frequency,
    wherein the method further incudes determining a frequency offset between the first frequency and the second frequency,
    wherein transmitting the indication of the second frequency comprises transmitting indication of the frequency offset from the apparatus to the at least one receiving user equipment,
    wherein the indication of the frequency offset indicates a frequency offset amount in frequency units with a granularity, and
    wherein indication of the frequency offset amount in frequency units with the granularity comprises one of the following:
        1.5 kHz with 15 kHz subcarrier spacing applied for synchronization signals or control signaling or both synchronization signals and control signaling provided by the apparatus; or
        3 kHz with 30 kHz subcarrier spacing applied for synchronization signals or control signaling or both synchronization signals and control signaling provided by the apparatus.

2. A method as in claim 1, further comprising transmitting, by the source user equipment to the at least one receiving user equipment, timing information regarding when the source user equipment will start using the second frequency.

3. A method as in claim 2, wherein the timing information is transmitted with the indication.

4. An apparatus comprising:
    at least one processor; and
    at least one memory storing instructions that, when executed by the at least one processor, cause the apparatus at least to perform:
    transmitting, by the apparatus, a first synchronization signal to at least one receiving user equipment with use of a sidelink, the first synchronization signal having a first frequency;
    causing transmitting, by the apparatus to the at least one receiving user equipment, an indication of a second frequency; and
    causing transmitting, by the apparatus to the at least one receiving user equipment, a second synchronization signal having the second frequency,
    wherein the at least one memory further stores instructions that, when executed by the at least one processor, cause the apparatus at least to perform:
    determining a frequency offset between the first frequency and the second frequency; and wherein transmitting the indication of the second frequency comprises transmitting indication of the frequency offset from the apparatus to the at least one receiving user equipment, wherein the indication of the frequency offset indicates a frequency offset amount in frequency units with a granularity, and wherein indication of the frequency offset amount in frequency units with the granularity comprises one of the following:

1.5 kHz with 15 kHz subcarrier spacing applied for synchronization signals or control signaling or both synchronization signals and control signaling provided by the apparatus; or 3 kHz with 30 kHz subcarrier spacing applied for synchronization signals or control signaling or both synchronization signals and control signaling provided by the apparatus.

5. An apparatus as in claim 4, wherein the at least one memory further stores instructions that, when executed by the at least one processor, cause the apparatus at least to perform:

causing transmitting, by the apparatus to the at least one receiving user equipment, timing information regarding when the apparatus will start using the second frequency.

6. An apparatus as in claim 5, wherein the at least one memory further stores instructions that, when executed by the at least one processor, cause the apparatus at least to perform:

causing transmitting of the timing information with the indication.

7. A non-transitory program storage device readable by a machine, tangibly embodying a program of instructions executable by the machine for performing operations, the operations comprising the method as claimed in claim 1.

8. An apparatus comprising:
at least one processor; and
at least one memory storing instructions that, when executed by the at least one processor, cause the apparatus at least to perform:

receiving, by the apparatus from a source user equipment with use of a sidelink between the source user equipment and the apparatus, a first synchronization signal having a first frequency;

receiving, by the apparatus from the source user equipment, an indication of a second frequency; and receiving, by the apparatus from the source user equipment, a second synchronization signal having the second frequency, wherein receiving the indication of the second frequency comprises receiving indication of a frequency offset from the apparatus to the at least one source user equipment, wherein the indication of the frequency offset indicates a frequency offset amount in frequency units with a granularity, and wherein indication of the frequency offset amount in frequency units with the granularity comprises one of the following:

1.5 kHz with 15 kHz subcarrier spacing applied for synchronization signals or control signaling or both synchronization signals and control signaling provided by the apparatus; or 3 kHz with 30 kHz subcarrier spacing applied for synchronization signals or control signaling or both synchronization signals and control signaling provided by the apparatus.

9. An apparatus as in claim 8, wherein receiving the indication of the second frequency comprises receiving frequency offset between the first frequency and the second frequency.

10. An apparatus as in claim 4, wherein the indication of the frequency offset indicates a frequency location of the second frequency.

11. An apparatus as in claim 10, wherein indication of the frequency location comprises one of the following:
a radio frequency channel; or
a synchronization raster location.

12. An apparatus as in claim 4, wherein the indication of the second frequency comprises information indicating applied numerology used for coming synchronization signal transmissions using the second synchronization signal.

* * * * *